United States Patent [19]
Smith et al.

[11] 3,750,785
[45] Aug. 7, 1973

[54] BAND SPRING CLUTCH

[75] Inventors: Lester E. Smith, Herrin; Chao H. Lin, Marion, both of Ill.

[73] Assignee: Olin Corporation, New Haven, Conn.

[22] Filed: Dec. 28, 1970

[21] Appl. No.: 101,820

[52] U.S. Cl. ............................ 192/81 C, 192/107 M
[51] Int. Cl. .............................................. F16d 41/20
[58] Field of Search ............... 192/81 R, 81 C, 41 S, 192/107 R, 107 M, 80, 55, 26, 37, 49; 64/30 E

[56] References Cited
UNITED STATES PATENTS

| | | | |
|---|---|---|---|
| 3,019,871 | 2/1962 | Sauzedde | 192/81 C |
| 3,466,947 | 9/1969 | Smith | 192/41 S X |
| 3,534,791 | 10/1970 | Peckham, Jr. | 192/41 S X |
| 2,425,731 | 8/1947 | Dodwell | 192/41 S X |
| 2,939,561 | 6/1960 | Rudisch | 192/41 S X |
| 2,643,749 | 6/1953 | Greenlee | 192/41 S X |
| 2,523,772 | 9/1950 | McGibbon et al. | 192/41 S X |

FOREIGN PATENTS OR APPLICATIONS

| | | | |
|---|---|---|---|
| 23,200 | 12/1900 | Great Britain | 192/41 S |
| 862,234 | 1/1953 | Germany | 192/41 S |
| 431,042 | 2/1948 | Italy | 192/41 S |

*Primary Examiner*—Manuel A. Antonakas
*Attorney*—Donald R. Motsko, H. Samuel Kieser and William W. Jones

[57] ABSTRACT

Band spring clutch assembly including a rotatable driving member and a rotatable driven member. The driving member has its outer surface formed of elastomeric material with which the band spring is in engagement when the driving member is driving the driven member.

10 Claims, 3 Drawing Figures

PATENTED AUG 7 1973 3,750,785

INVENTORS.
LESTER E. SMITH
CHAO H. LIN

BY *H. Samuel Kieser*

ATTORNEY

BAND SPRING CLUTCH

This invention relates generally to band spring clutches, and more particularly to band spring clutches of the type which permit the driven member of the clutch to override the driving member.

Although band spring clutches of the type utilizing a spring steel band member between two members to transmit rotary motion are known in the art, the present invention is directed to an improved clutch of this type which overcomes several disadvantages inherent in the prior art devices.

One object of the present invention is to provide a clutch assembly wherein there is no slippage when the clutch is subjected to relatively high impact torque.

Another object of the present invention is the provision of a clutch assembly wherein wear is minimized during overrunning of the assembly.

Yet another object of the present invention is the provision of a band clutch assembly wherein stress concentration on the band spring is minimized.

A still further object of the present invention is to provide a band clutch assembly which can be made small in size and manufactured relatively inexpensively.

These and other objects and advantages of the present invention will become more apparent by reference to the following description and to the accompanying drawings in which.

Figure 1:
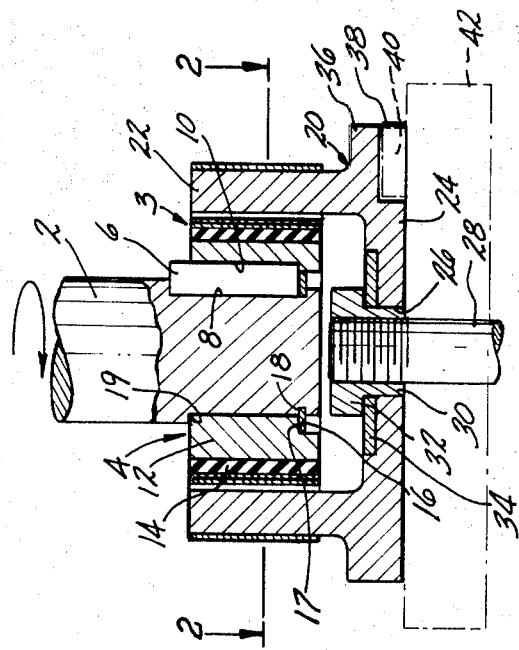
FIG. 1 is a cross sectional view of one embodiment of a band spring clutch constructed in accordance with the present invention.

Referring to the drawings, FIG. 1 shows a shaft 2 which may be used to impart the driving force to the clutch assembly 3. In one application of the present invention, the shaft 2 may be part of a starting motor of an engine starting system. The clutch assembly 3 includes a cylindrical member 4 which may be considered the driving member of the clutch assembly. The cylindrical member 4 is keyed to the shaft 2 by key 6 located in a groove 8 in the shaft 2 and a corresponding groove 10 in the driving member 4.

The driving member 4 comprises a hollow, generally cylindrical, metallic element 12 which has a layer of elastomeric material attached to it to form an elastomeric outer surface 14 on the driving member 4. This elastomeric material is preferably natural or synthetic rubber. However, it may be any other elastomeric material which has the requisite properties described below. The driving member 4 is held in position axially by means of a split washer 16 which is mounted in a circumferential groove 18 in the shaft 2 and in abutment with the bottom 17 of a counterbore in the end of the driving member 4, and by a shoulder 19 on the shaft.

A cup-shaped member 20, which may be considered the driven member of the clutch assembly, includes a hollow, cylindrical portion 22 which envelopes and surrounds in spaced relationship the driving member 4. The end closure portion 24 of the driven member 20 includes an aperture 26 for the reception of a shaft 28 which is threaded onto a flanged bushing 30 mounted in the aperture 26. The flange 32 of the bushing 30 rests on a thrust plate 34 mounted in the inside surface of the end closure 24 of the driven member 20.

The driven member 20 also includes a flange 36 extending circumferentially about the driven member 20 and projecting outwardly from the end closure 24. The outside surface of the end closure 24 and flange 36 have a plurality of notches 38 therein (only one of which is shown in the drawings) to receive lugs 40 which may project from the member to be driven by the clutch assembly indicated by reference numeral 42 in FIG. 1. By way of an example, the member 42 may be the flywheel of an engine when the device is used in an engine starting system.

Figure 2:
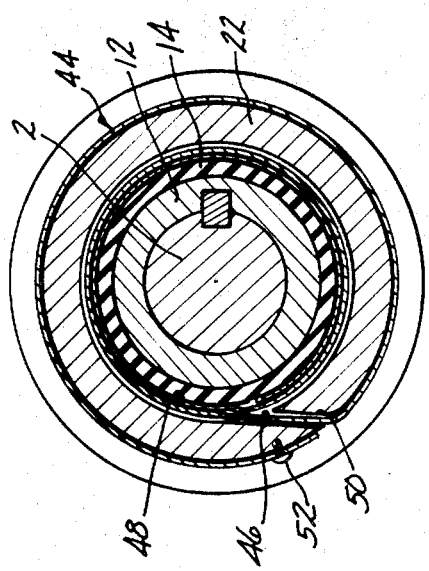
FIG. 2 is a sectional view taken along the lines 2—2 of FIG. 1.

A band spring 44 fabricated from spring steel, is used to connect the driving member 4 to the driven member 20. In the embodiments shown in FIGS. 1 and 2, the free end of the band spring 44 is wrapped around the driving member 4 for substantially two loops as shown in FIG. 2. The band spring 44 has a straight intermediate portion 46 projecting tangentially from the loop portion 48 through a slit 50 in the hollow cylindrical portion of the driven member 20. The band spring 44 is then coiled or wrapped about the outside surface of the hollow cylindrical portion 22 of the driven member 20 in the same direction as the loops or wraps of the band spring 44 about the driving member 4 with the outside end of the band spring 44 terminating adjacent the point where the spring projects through slit 50. The end of the spring adjacent slit 50 is integrally attached to the driven member 20 by means of rivets or screws 52 or any other suitable means such as by bonding, welding, or the like.

With the clutch assembly at rest, the inner loop of band spring 44 is in contact with the elastomeric surface 14 of the driving member 4 and the two loops of the spring are in contact with each other. When shaft 2 applies torque to the driving member 4 in the direction indicated by the arrow in FIG. 1, the frictional force between the elastomeric surface 14 and the inner wrap of the band spring 44, as well as the frictional force between the two loops of the spring is such that the torque is transmitted to the spring which in turn transmits it to the driven member 20 such that the driven member 20 will rotate with the driving member 4.

When the driven member 20 is rotated at a speed faster than the driving member 4, as for example when the engine has started if the assembly is used in an engine starting system, the loops of the spring 44 will centrifuge away from the elastomeric surface 14. This disengagement of the band spring 44 from the elastomeric surface 14 of the driving member 4 avoids wear to the assembly. When the engine stops, and the spring is no longer subject to the centrifugal force, the spring contracts to its normal state and grips on the elastomeric surface 14 ready for another cycle.

In the embodiment as shown in FIGS. 1 and 2, it has been found that a definite relationship exists between the coefficient of friction between the spring and the elastomeric surface 14 and the coefficient of friction between the spring wraps themselves. The required coefficient of friction between the band spring and the elastomeric surface is equal to $1 + \mu' \pi/\pi(3-\mu' \pi)$ where $\mu'$ is equal to the coefficient of friction between the two loops of the spring and $\pi$ is equal to 3.1416 radians. Thus, for example, if the coefficient of friction between the two loops of the spring is 0.05, the required coefficient of friction between the elastomeric surface and the inner loop of the spring must be at least 0.129. Minimum values for the coefficient of friction between the inner loop of the spring 44 and the elastomeric surface ($\mu$) for various values for the coefficient of friction between the two loops of the spring 44 are given in the following table.

TABLE I

| $\mu'$ | .10 | .15 | .20 | .25 | .30 | .318 |
|---|---|---|---|---|---|---|
| $\mu$ | .156 | .185 | .218 | .257 | .300 | .318 |

Due to the fact that the band spring 44 has a portion wrapped around the outside of the driven member 20, the stress concentration which arises due to the integral connection of the band spring 44 to the driven member 20 is reduced because the frictional contact between band spring 44 and the outer surface of the driven member 20 reduces the force applied in the region where band spring 44 is integrally connected to the driven member 20. By proper choice of the coefficient of friction between the spring and the elastomeric surface it is assured that the gripping frictional force between the spring and the driven member 20 is always equal to or greater than the tensile force. If the tensile force is higher than the frictional force, the clutch would slip.

Figure 3:
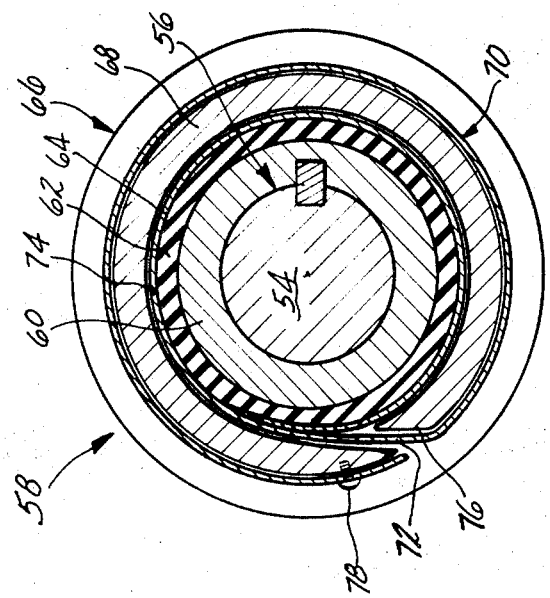
FIG. 3 is a sectional view similar to that of FIG. 2, but showing a second embodiment of the clutch assembly of the present invention.

In the embodiment shown in FIG. 3, a shaft 54 identical to shaft 2 of the previous embodiment is shown keyed to a driving member 56 of a clutch assembly 58. The driving member 56 is identical to driving member 4 of the previous embodiment and includes a hollow, generally cylindrical, metallic element 60 which has a layer of elastomeric material 62 attached to it to form an elastomeric outer surface 64. The driven member 66 of the clutch assembly 58 includes a hollow cylindrical portion 68 which envelopes and surrounds in spaced relationship the driving member 56. The driven member 66 of this embodiment is identical to the driven member 20 of the previous embodiment.

As in the previous embodiment, a band spring 70, fabricated from spring steel is used to connect the driving member 56 to the driven member 66. In this particular embodiment, the free end of the band spring 70 is wrapped around the driving member 56 for slightly more than one loop as shown. The band spring 70 includes a straight intermediate portion 72 projecting tangentially from the loop portion 74 through a slit 76 in the driven member 66. The band spring 70 is then coiled or wrapped around the outer surface of the hollow cylindrical portion 68 of the driven member 20 in the same direction as the loop 64 with the outside end of the band spring 70 terminating adjacent the point where the spring projects through slit 76. The outside end of the spring is attached to the driven member 66 by means of rivets or screws 78 or by any other suitable method.

The embodiment of FIG. 3 functions identical to the embodiment of FIGS. 1 and 2. When the shaft 54 applies torque to driving member 56 in the direction indicated by the arrow in FIG. 3, the spring will transmit torque to the driven member 66 so that the driven member 66 will rotate with the driving member 56. When the driven member 66 is rotated at a speed faster than the driving member 56, the loop of the band spring 70 will centrifuge away from the elastomeric surface 62 avoiding wear to the clutch assembly. When the rotation of the clutch assembly stops, and the spring is no longer subjected to the centrifugal force, the spring contracts to its normal state and grips on the elastomeric surface 62 ready for another cycle.

It has been found that the coefficient of friction between the spring 64 and the elastomeric surface 62 must be equal to or greater than 0.318. If the coefficient of friction is less than this amount, slippage will occur. It is to be understood that the embodiment of FIG. 3 possesses all the advantages of the embodiment of FIGS. 1 and 2 in that stress concentration is reduced, wear is minimized, and the assembly can be made relatively small and relatively inexpensively.

What is claimed is:

1. A band spring clutch assembly comprising a rotatable driving member having a cylindrical outer surface of elastomeric material, a rotatable driven member including a hollow cylindrical portion enveloping and surrounding in spaced relatonship the elastomeric outer surface of said driving member, and a band spring having one end connected to said driven member and its free end coiled about said elastomeric surface forming a coiled portion, said spring being in frictional engagement with said elastomeric surface when said driving member is driving said driven member.

2. The clutch assembly of claim 1 wherein the coiled portion is one loop and the coefficiet of friction between the elastomeric surface and said spring is at least 0.318.

3. The clutch assembly of claim 2 wherein said elastomeric material is rubber.

4. The clutch assembly of claim 1 wherein said band spring is coiled about said driving member twice, the coefficient of friction between the band spring and elastomeric surface being equal to $(1 + \mu' \pi)/\pi(3 + \mu' \pi)$ where $\mu'$ is equal to the co-efficient of friction between the first and second coils of the spring and $\pi = 3.1416$ radians.

5. The clutch assembly of claim 4 wherein said elastomeric material is rubber.

6. The clutch assembly of claim 1 wherein said hollow cylindrical portion of said driven member has a slot therethrough, said band spring having a portion extending tangentially from said coiled portion through said slot and another portion coiled about the outside surface of the cylindrical portion of said driven member in the same direction as the free end is coiled about the driving member, said nother portion being attached to said driven member.

7. The clutch assembly of claim 6 further including a drive shaft connected to said driving member.

8. The clutch assembly of claim 7 wherein said driving member comprises a hollow cylindrical member, said shaft having a reduced portion forming a shoulder thereon, said reduced portion being received within said driving member with one end of said driving member in abutment with said shoulder, the other end of said driving member having a counterbore therein, said reduced portion of said shaft having a circumferential groove therein, a split ring received within said groove and being in abutment with the bottom of said counterbore, and key means between said shaft and said driving member for providing a driving connection therebetween.

9. The clutch assembly of claim 6 wherein said driven member includes an end portion, said end portion including means for connecting said driven member to another member.

10. The clutch assembly of claim 9 further comprising a shaft, said end portion being received on said shaft.

* * * * *